Figure 1:
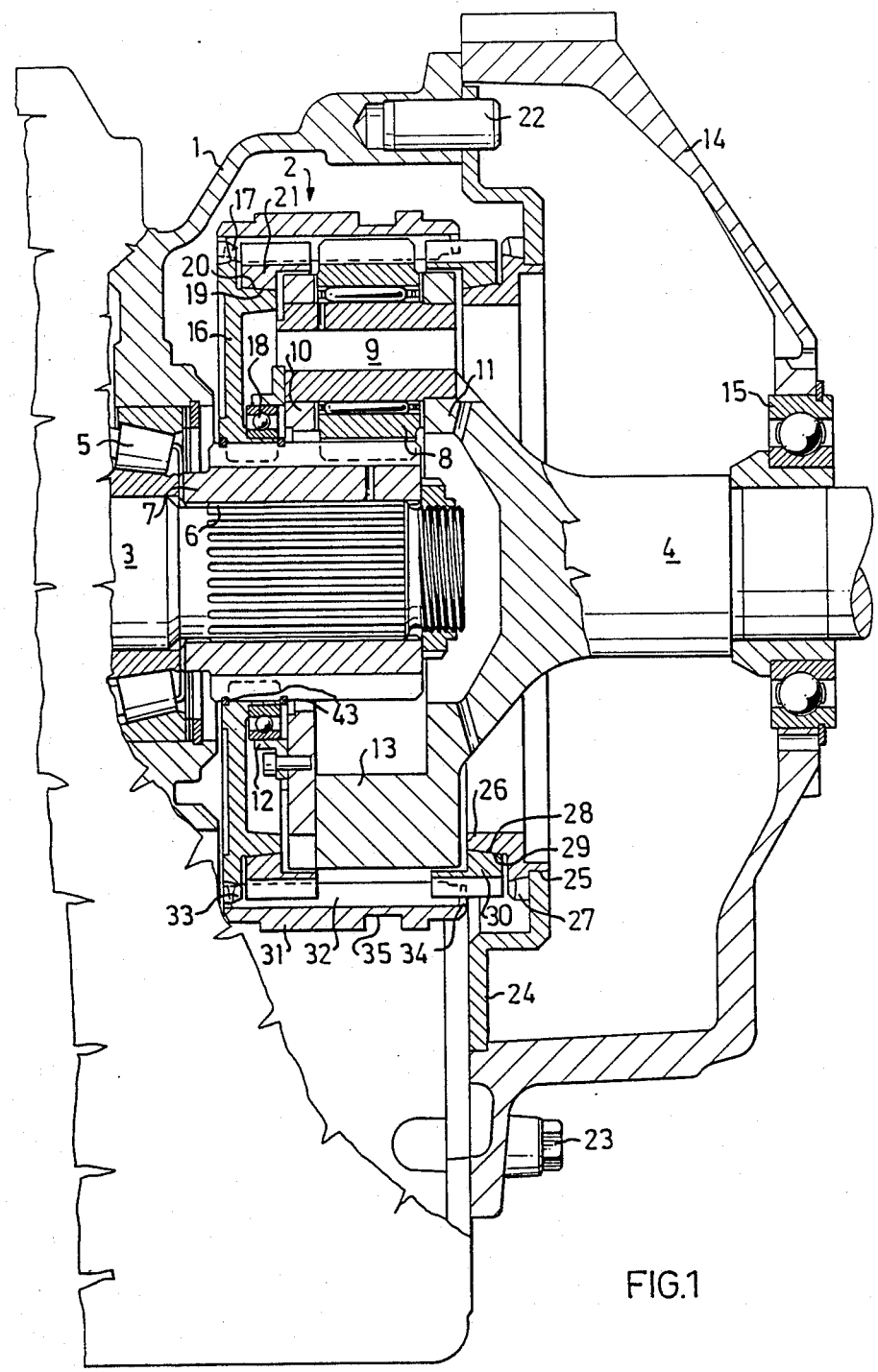

United States Patent [19]

Adler

[11] Patent Number: 4,821,591

[45] Date of Patent: Apr. 18, 1989

[54] AUXILIARY GEARBOX FOR MOTOR VEHICLES

[75] Inventor: Horst F. Adler, Södertälje, Sweden

[73] Assignee: Saab-Scania Aktiebolag, Södertälje, Sweden

[21] Appl. No.: 28,765

[22] Filed: Mar. 23, 1987

[30] Foreign Application Priority Data

Mar. 26, 1986 [SE] Sweden .............................. 8601399

[51] Int. Cl.$^4$ .......................... F16H 3/38; F16H 3/44; F16H 11/00; F16H 13/00

[52] U.S. Cl. ......................................... 74/339; 74/785; 192/53 F

[58] Field of Search ......................... 74/339, 340, 785; 192/53 R, 53 A, 53 F, 53 G

[56] References Cited

U.S. PATENT DOCUMENTS

| | | | |
|---|---|---|---|
| 1,598,586 | 8/1926 | Lanquetin | 74/785 |
| 2,331,684 | 10/1943 | Henningsen | 74/785 |
| 4,569,252 | 2/1986 | Harper | 74/785 |
| 4,667,538 | 5/1987 | Larsson | 74/785 |

FOREIGN PATENT DOCUMENTS

| | | |
|---|---|---|
| 1750546 | 1/1971 | Fed. Rep. of Germany . |
| 435831 | 10/1984 | Sweden . |
| 914843 | 3/1982 | U.S.S.R. .............. 74/785 |
| 624170 | 5/1949 | United Kingdom ............ 192/53 R |

Primary Examiner—Dirk Wright
Assistant Examiner—Harold F. Macris
Attorney, Agent, or Firm—Cushman, Darby & Cushman

[57] ABSTRACT

The invention relates to a planetary gear type auxiliary gearbox intended to be inserted between a main gearbox and a transmission to the driving wheels in a motor vehicle. The input shaft of the planetary gear is rigidly connected to a sun wheel, while the output shaft of the planetary gear is rigidly connected to a planet wheel carrier carrying a plurality of planet wheels meshing with the sun wheel.

The planetary gear further includes a clutch ring non-rotatably connected to the gearbox housing and a clutch ring non-rotatably connected to the input shaft. The invention is distinguished in that the ring gear of the planetary gear is formed with engagement teeth at its axial ends, in that the clutch rings are arranged on either side of the planet wheels and in that the ring gear is axially movable to enable alternative engagement with the clutch rings by its engagement teeth. The invention results in favorable load distribution with regard to both torque and bending stresses. In addition, there is obtained a simple structure which allows the gearbox to be formed such that its length is comparatively short.

2 Claims, 2 Drawing Sheets

AUXILIARY GEARBOX FOR MOTOR VEHICLES

The present invention relates to an auxiliary gearbox, intended to be inserted between a main gearbox and a transmission to the driving wheels in a motor vehicle, and including a gearbox housing accommodating an input shaft from the main gearbox, an output shaft to the transmission, a planetary gear arranged between the input shaft and the output shaft, this planetary gear comprising a sun wheel fixed to the input shaft, a plurality of planet wheels meshing with the sun wheel and rotatably mounted on a planet wheel carrier non-rotatably mounted on the output shaft, and a ring gear surrounding and meshing with the planet wheels, the gearbox housing also accommodating a clutch ring non-rotatably connected to the gearbox housing and a clutch ring non-rotatably connected to the input shaft.

In transmission systems for heavy vehicles, e.g. trucks or lorries, it is known to connect an auxiliary gearbox to the vehicle main gearbox with the object of doubling the number of gear change possibilities. Such an auxiliary gearbox usually includes a planetary gear with the aid of which the gear change possibilities of the drive unit can be subdivided into a low gear range and a high gear range. The gear ratio in the planet gear is utilized in the low gear range, but not in the high gear range.

In known embodiments of such a planetary gear it is normal practice to have the input shaft non-rotatably connected to the sun wheel of the planetary gear and for the output shaft to be non-rotatably connected to a planet wheel carrier. In such a case the ring gear of the planetary gear is connectable with the aid of a clutch means, either to a fixed wall or the like in the gearbox housing or to the output shaft, thus obtaining the low gear range or the high gear range of the gearbox.

In such an embodiment the clutch means is arranged around the output shaft from the planetary gear. This results in that the planetary gear sun wheel can be placed at a short distance from the main gearbox and that the input shaft of the planetary gear can be made short, which is favourable for withstanding the bending stresses to which both shafts of the planetary gear are subjected. However, this embodiment creates disadvantages in driving in the high gear range, since the mesh of the coacting teeth in the planetary gear is subject to forces greatly increased by mechanical advantage, thus subjecting the planet wheel carrier and the output shaft to a high torque.

With the object of avoiding that the planetary gear is subjected to these forces and torques caused by mechanical advantage, it is known in another embodiment to arrange the clutch means about the input shaft instead of about the output shaft. In the high gear range the ring gear is then engaged with the input shaft. This embodiment results in that the sun wheel must be arranged at a somewhat greater distance from the main gearbox and is somewhat poorer than the embodiment described above, with regard to the bending stresses to which the shafts in the planetary gear are subjected. The advantages of being able to limit forces and torques in the high gear range outweigh the disadvantages with the bending stresses, and this embodiment is therefore the most advantageous, at least with regard to utilization in heavy vehicles.

In both the above-mentioned embodiments it is known to form the clutch means as synchronizing clutch means, resulting in the advantage that changing from high to low gear range, and vice versa, can take place under operating conditions. With the object of keeping the costs of these synchronizing clutch means low, it is known to utilize conventional synchronizing clutch means which are intended for multichange gearboxes. In such cases a non-rotatable connection between the ring gear and some suitable part included in the synchronizing clutch means is arranged. However, the non-rotatable connection between the ring gear and the synchronizing clutch means results in that further details must be fitted to the planetary gear, which requires space and usually also complicates assembly of the entire planetary gear.

The present invention relates to a planetary gear which, in contradistinction to what has been said about known embodiments has an advantageous embodiment with relation to the forces to which the planetary gear is subjected in high gear range, and the forces to which the planetary gear is subjected due to bending. In this embodiment it is also striven to obtain simple assembly of the planetary gear in manufacture and service and that the entire planetary gear will be simply implemented with few parts.

In accordance with the invention this is achieved by the ring gear being formed with engagement teeth at its axial ends, in that the clutch rings are arranged axially on either side of the planet wheels and in that the ring gear is axially displaceable to enable its engagement teeth to be engaged with either of the clutch rings. The inventive implementation results in that for engaging the high gear range the ring gear is connected to the input shaft of the planetary gear and this results in that the gear is not subjected to any forces increased by mechanical advantage.

The invention also achieves that the sun wheel may be arranged relatively close to the main gearbox and that the bending stresses on the shafts of the planetary gear will be favourable as a result thereof. By inventively implementing the ring gear with engagement teeth it can be utilized as a clutch means, a more simple implementation thus being obtained than what is to be found in the prior art.

Figure 2:
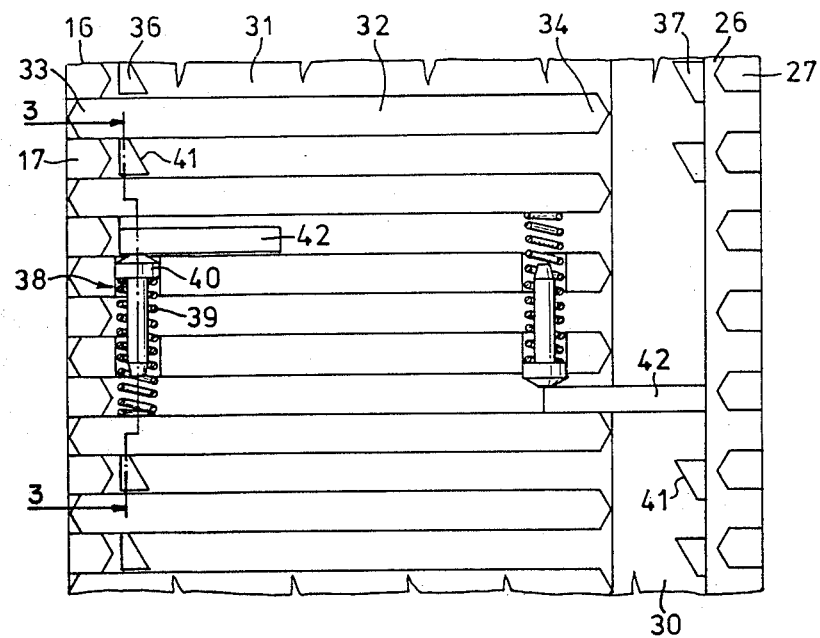
Figure 3:
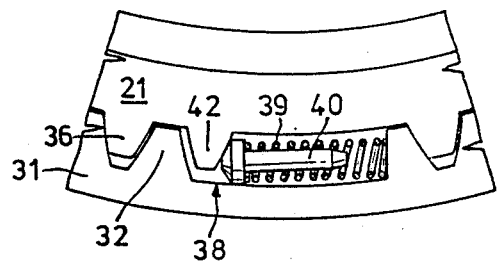

Further distinguishing features of the invention are apparent from the accompanying description of an embodiment exemplifying the invention. The description is carried out with reference to the accompanying drawings, on which FIG. 1 is an axial longitudinal section of an inventive planetary gear;

FIG. 2 is a schematic view of coacting engagement teeth during synchronizing and engagement, and FIG. 3 is an axial, partial section on the line III—III FIG. 2 of the ring gear and a synchronizing ring.

An auxiliary gearbox in accordance with the invention is intended for fitting to a main gearbox in a heavy vehicle, e.g. a truck or lorry. The auxiliary gearbox includes a planetary gear 2 accommodated in a gearbox housing 1, the former being arranged between an input shaft 3 coming from the main gearbox, and an output shaft 4 departing from the auxiliary gearbox. The input shaft 3 is rotatably mounted in the main gearbox with the aid of a bearing 5 mounted in an inner end wall in the gearbox housing 1.

A sun wheel 7 included in the planetary gear 2 is non-rotatably mounted on the input shaft 3 with the aid of splines 6. The sun wheel is formed with external teeth meshing with five surrounding planet wheels 8. Each planet wheel 8 is journalled on a tubular stub shaft 9, one end of which is a press fit in a planet wheel keeper 10 and the other end of which is a press fit in a planet wheel carrier 11. The planet wheel keeper 10 is fastened to axial abutments 13 on the planet wheel carrier 11 by axial bolt joints (not shown), the planet wheel carrier 11 being integrated with the output shaft 4 of the planetary gear 2 and rotatably mounted in an outer end wall 14 on the gearbox housing 1 with the aid of a ball bearing 15.

A clutch ring 16 formed with exterior engagement teeth 17 is non-rotatably mounted on the sun wheel 7 by means of meshing teeth. With the aid of a ball bearing 18 the clutch ring 16 supports the planet wheel keeper 10 via a hub 12, which is bolted to the planet wheel carrier 11. The clutch ring 16 is axially positioned in relation to the sun wheel 7 by means of two circlips 43, which are removably accommodated in two grooves in the sun wheel 7 on either side of the clutch ring 16.

The clutch ring 16 is also formed with a radially outwardly directed conical friction surface 19, intended for coaction with a correspondingly inwardly directed conical friction surface 20 on a synchronizing ring 21.

The gearbox housing 1 comprises two halves and in the parting plane between them there is a reaction disc 24 with a central hole 25, the reaction disc being positioned and fastened by a plurality of locating pins 22 and bolts 23. A clutch ring 26 is welded in said central hole 25 and is formed with external engagement teeth 27. The clutch ring 26 is also formed with an outwardly directed conical friction surface 28 intended for coaction with a corresponding inwardly directed conical friction surface 29 on a synchronizing ring 30. This synchronizing ring 30 is formed identically the same as the previously mentioned synchronizing ring 21, the synchronizing rings 21,30 being arranged mutually left-hand and right-hand axially on either side of the planet wheels 8. The latter are conventionally surrounded by a ring gear 31 formed with internal teeth 32 meshing with the planet wheels 8. Furthermore, the ring gear 31 is formed with internal engagement teeth 33,34 at its axial ends, these teeth being intended for coaction with the engagement teeth 17,27 of the clutch rings 16,26. It is advantageous if the engagement teeth 33,34 and teeth 32 of the ring gear 31 are mutually integrated, as illustrated in FIG. 2.

The ring gear 31 is axially movably mounted in relation to the planet wheels 8. Externally, the ring gear 31 is formed with a circumferential groove 35 for engagement by an unillustrated engaging fork to give the ring gear 31 axial displacement when changing gears. FIG. 2 illustrates in principle the coaction between the engagement teeth 33,34 on the ring gear 31, the engagement teeth 17,27 on the respective clutch rings 16,26 and the detent teeth 36,37 on the respective synchronizing rings 21,30. The left-hand part of FIG. 2 illustrates, similarly to FIG. 1, how the ring gear 31 is engaged with the left-hand clutch ring 16, while the right-hand part of FIG. 2 illustrates how the ring gear 31 is not engaged with the right-hand clutch ring 26.

The internal teeth 32 of the ring gear 31 meshing with the planet wheels 8 merge at the axial ends of the ring gear 31 into the internal engagement teeth 33,34, which are intended to coact with the detent teeth 36,37 on the synchronizing rings 21,30 and the engagement teeth 17,27 on the clutch rings 16,26 during engaging movements. The teeth 32 on the ring gear 31 are formed with two axially separate recesses 38 at five uniformly, angularly distributed areas, each recess accommodating a spring means in the form of a helical compression spring 39. One end of each spring 39 engages against one of the teeth 32 of the ring gear 31, and abuts with its other end against a piston 40. The detent teeth 36 of the synchronizing ring 21, these also being partially illustrated in FIG. 3, are formed with a contour agreeing with the contour of the internal teeth 32 of the ring gear 31 and the engagement teeth 33,34. In a radial view according to FIG. 2 of the detent teeth 36,37 of the synchronizing rings 21,30, it will be seen that the detent teeth 36,37 extend axially only along a part of the extension of the synchronizing rings 21,30 and that they are formed with chamfered side faces 41 facing towards the ring gear 31. In the areas of the five uniformly angularly distributed recesses 38 in the ring gear 31 the synchronizing rings 21,30 lack detent teeth 36,37, but on the other hand they are formed with a cog 42 having axial extension along the entire length of the synchronizing rings 21,30. These cogs 42 have a slimmer contour than the remaining teeth 36 on the synchronizing ring 21, and are in constant mesh with the teeth 32 of the ring gear 31 with a certain amount of angular play, whereby the synchronizing rings 21,30 accompany the ring gear 31.

The previously described helical springs 39 in the ring gear 31 engage with their respective pistons 40 against the cogs 42 on the synchronizing rings 21,30 and cause these rings an angular movement relative the ring gear 31 within the limits allowed by the play between the cogs 42 of the synchronizing ring 21 and the teeth 32 of the ring gear 31.

The function of the described planetary gear 2 is as follows. In the accompanying figures the planetary gear 2 is illustrated with its high gear range engaged. The engagement teeth 33 of the ring gear 31 thus mesh with the engagement teeth 17 on the left-hand clutch ring 16, the ring gear 31 being non-rotatably connected to the sun wheel 7 and the input shaft 3. The output shaft 4 will thus rotate at the same speed as the input shaft 3. When the low gear range of the planetary gear 2 is engaged, the ring gear 31 is displaced axially with the aid of the engaging fork accommodated in the groove 35. This displacement takes place to the right in FIGS. 1 and 2. If changing from the high gear range to the low gear range takes place under operating conditions, the ring gear 31 will rotate at a certain rate in the high gear range, but the right-hand clutch ring 26 will not rotate, since it is rigidly connected to the gearbox housing 1.

Before the low gear range can be engaged, the rotation of the ring gear 31 must be arrested. It is assumed that the rotation of the ring gear 31 in the high gear range has a direction corresponding to an upward movement in FIG. 2. After a certain displacement, when the ring gear 31 is moved to the right in FIG. 2, the engagement teeth 34 on the left-hand side of it will be disengaged from the left-hand clutch ring 16 and thus also from the input shaft 3. Simultaneously the engagement teeth 227 on the right-hand side of the ring gear 31 will come into abutment against the chamfered end faces 41 on the detent teeth 37 of the synchronizing ring 30. The friction surfaces 28,29 on the friction ring 30 and clutch ring 26 will then come into mutual gliding engagement. The synchronizing ring 30 is thus subjected to an arresting torque acting downwardly in FIG. 2, i.e. counter to the rotational direction of the ring gear 31. The arresting torque of the synchronizing ring 26 coacts with the springs 39 in the right-hand recesses 38 for rotating the synchronizing ring 26 downwards relative the ring gear 31. In this position the detent teeth 37 of the synchronizing ring 30 inhibit continued axial displacement of the ring gear 31.

Engagement between the detent teeth 37 of the synchronizing ring 30 and the engagement teeth 34 of the ring gear 31 results in that these come into mutual rotation during the synchronizing process and thus also that the rotation of the ring gear 31 is arrested. After the rotation of the synchronizing ring 30 and the ring gear 31 has been completely arrested, the arresting torque on the synchronizing ring 30 also ceases completely. The axial force which the engagement teeth 34 of the ring gear 31 exert on the chamfered end faces 41 of the detent teeth 37 is sufficient for turning the synchronizing ring 30 relative the ring gear 31 to a non-detent position, where its detent teeth 37 do not block the axial displacement of the ring gear 31. The ring gear 31 can thus be brought into engagement with the engagement teeth 27 of the clutch ring 26, and is thus non-rotatably connected to the gearbox housing 1. The low gear range of the planetary gear 2 is thus engaged, conventionally to obtain a gear ratio between the input shaft 3 and the output shaft 4.

Gear range changing from the low gear range back to the high gear range takes place analogously, by the ring gear 31 being moved to the left in FIGS. 1 and 2. If a gear range change takes place under operating conditions, it is necessary to accelerate the ring gear 31 up to the same rotational speed as the input shaft 3.

Similar to what has been said above, it is assumed that the rotation of the input shaft 3 is in a direction corresponding to an upward movement in FIG. 2. In the low gear range the left-hand clutch ring 16 rotates, while the ring gear 31 does not rotate. When the latter is moved to the left, the detent teeth 36 of the left-hand synchronizing ring 21 will block movement of the ring gear 31 until synchronous rotation has been attained. During the synchronizing process the synchronizing ring 21 is subjected to a torque due to gliding engagement between the respective friction surfaces 19,20 on it and the clutch ring 16, this torque giving angular movement to the synchronizing ring 21, in coaction with the compression springs 39, to assume a detent position. The direction of this torque corresponds to movement of the synchronizing ring 21 upwards in FIG. 2.

After synchronous rotation has been attained, the synchronizing ring 21 and the ring gear 31 rotate at the same rate as the clutch ring 16. Solely under the bias of the springs 39 the synchronizing ring 21 can be rotated relative the ring gear 31 to a non-detent position allowing the ring gear 31 to be axially moved and engaged with the clutch ring 16.

As is thus apparent from the above, the torques acting on both synchronizing rings 21,30 during the engagement changing sequence are always directed in the same direction for the respective synchronizing rings 21,30. This enables the chamfered end surfaces 41 of the detent teeth 36,37 to have an asymmetric configuration according to FIG. 2. The respective synchronizing ring 21,30 thus has a detent position and a non-detent position, these positions corresponding to the end positions for the motions of the axial cogs 42 on the synchronizing rings 21,30 relative the teeth 32 and engagement teeth 33,34 of the ring gear 31.

The embodiment of the inventive auxiliary gearbox allows favourable force distribution to be obtained in driving in the high gear range by the ring gear 31 being engaged with the input shaft 3. Since only one synchronizing clutch is arranged about the input shaft 3, the axial distance between the bearing 5 of the input shaft and the planet wheels 8 can be made relatively short. At the same time, the axial distance between the bearing 15 of the output shaft 4 and the planet wheels 8 may be made relatively long. Both these conditions are favourable with relation to the bending stresses to which the input and output shafts 3 and 4 are subjected.

The inventive auxiliary gearbox further permits the respective conical friction surfaces 20,29 and 19,28 on the synchronizing rings 21,30 and clutch rings 16,26 to be arranged at a large radial distance from the input and output shafts 3,4. This results in that the torques caused by the friction forces during the synchronizing sequence may attain high values. In turn this results in that the dimensions of the friction surfaces 19,20,28,29, particularly in an axial direction, can be kept within low values and the entire gearbox can be implemented such as to be comparatively short.

From the aspect of assembly, the inventive auxiliary gearbox has several advantages. Since the left-hand clutch ring 16 engages non-rotatably and directly with the sun wheel 7, the input shaft 3 does not need any particular machining. The sun wheel 7 must indeed be formed with a somewhat longer axial extension than what is otherwise required, but from the point of manufacturing and costs this is of subordinate significance.

In assembling the planetary gear, remaining parts can be readily fitted by being thrust axially on to the sun wheel 7 after the latter has been fitted to the input shaft 3. This enables the majority of the planetary gear parts to be pre-assembled to a large extent, which further simplifies assembly.

Within the scope of the following claims, the invention can be modified and formed otherwise than what has been described with reference to the above example.

I claim:

1. Gearbox intended to be inserted between a main gearbox and a transmission to the driving wheels in a motor vehicle, and including a gearbox housing accommodating an input shaft from the main gearbox, an output shaft to the transmission, a planetary gear system arranged between the input shaft and the output shaft, said planetary gear comprising a sun wheel rigidly fixed to the input shaft, a plurality of planet wheels meshing with said sun wheel and rotatably mounted on a planet wheel carrier non-rotatably mounted on the output shaft, and a ring gear surrounding and meshing with the planet wheels, the gearbox housing also accommodating a clutch ring non-rotatably attached to the gearbox housing and a clutch ring non-rotatably attached to the input shaft, said clutch rings being arranged axially on either side of the planet wheels, and between the ring gear and the respective clutch ring, there being arranged synchronizing rings, characterized in that the synchronizing rings have axial external cogs meshing with angular play between the engagement teeth of the ring gear and characterized in that the ring gear, at its axial ends, is formed with engagement teeth that are integrated with its internal teeth, which internal teeth mesh with the planet wheels, and that the ring gear is axially displaceable to enable its engagement teeth to be engaged with either of the clutch rings.

2. Gearbox intended to be inserted between a main gearbox and a transmission to the driving wheels in a motor vehicle, and including a gearbox housing accommodating an input shaft from the main gearbox, an output shaft to the transmission, a planetary gear system arranged between the input shaft and the output shaft, said planetary gear comprising a sun wheel rigidly fixed to the input shaft, a plurality of planet wheels meshing with said sun wheel and rotatably mounted on a planet wheel carrier non-rotatably mounted on the output shaft, and a ring gear surrounding and meshing with the planet wheels, the gearbox housing also accommodating a clutch ring non-rotatably attached to the gearbox housing and a clutch ring non-rotatably attached to the input shaft, said clutch rings being arranged axially on either side of the planet wheels, and between the ring gear and the respective clutch ring there being arranged synchronizing rings, characterized in that the ring gear, at its axial ends, is formed with engagement teeth that are integrated with its internal teeth, which internal teeth mesh with the planet wheels, that the synchronizing rings are formed with detent teeth and with axial external cogs meshing with angular play between the engagement teeth of the ring gear, and that the ring gear is axially displaceable to enable its engagement teeth to be engaged with either of the clutch rings, the ring gear being internally formed with a plurality of recesses accommodating means including springs giving the synchronizing rings angular motion relative the ring gear to a detent position in which the detent teeth of the synchronizing rings block and ring gear from axial movement and engagement with the respective clutch ring.

* * * * *